S. C. KNIGHT.
Seed-Planter.

No. 213,430. Patented Mar. 18, 1879.

Witnesses:
John B. F. Lumpkin
J. S. Anchen

Inventor:
Selman C. Knight

UNITED STATES PATENT OFFICE.

SELMAN C. KNIGHT, OF LIVINGSTON, GEORGIA.

IMPROVEMENT IN SEED-PLANTERS.

Specification forming part of Letters Patent No. 213,430, dated March 18, 1879; application filed June 4, 1878.

*To all whom it may concern:*

Figure 1:
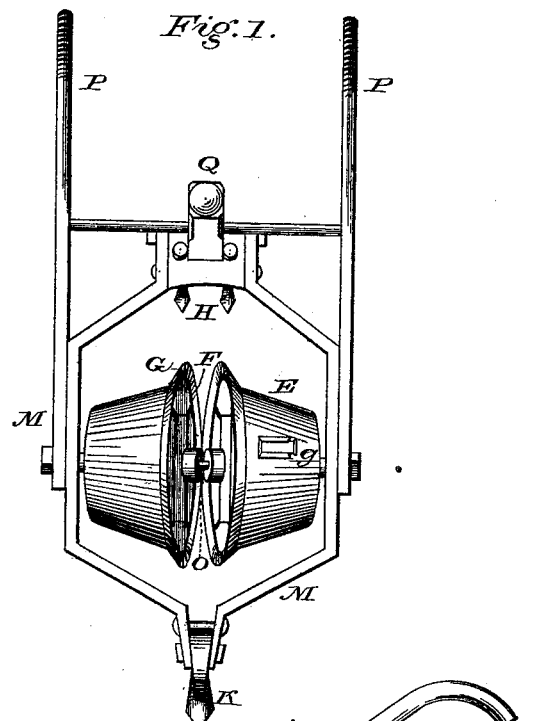
Figure 2:
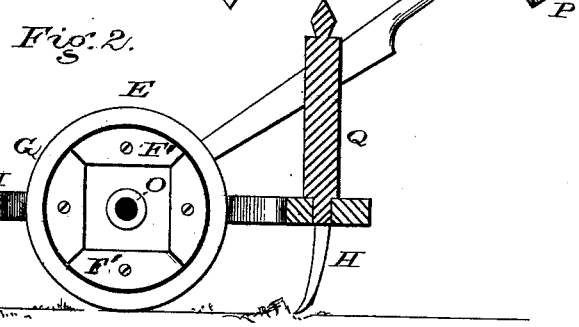
Figure 3:
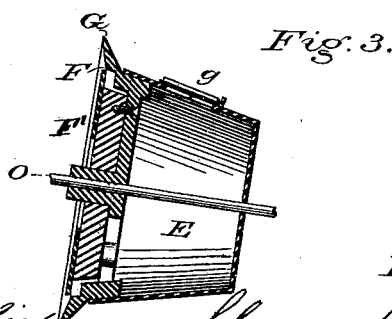

Be it known that I, SELMAN C. KNIGHT, of Livingston, in the county of Floyd and State of Georgia, have invented certain Improvements in Seed-Planters, of which the following is a specification:

In the accompanying drawings, which form a part of this specification, Figure 1 is a plan; Fig. 2, a central vertical section, and Fig. 3 a detail in section.

In carrying out my invention I employ the ordinary frame, with handles, beams, braces, &c., and it is provided at the front end with a plow to open the drill, and two or more harrow-plows at the rear, to fill the drill and cover the seed. These plows are vertically adjustable by means of perforations in the shanks of each.

In the side beams of this frame I secure a shaft rigid with the said frame. This shaft is bent at its center, and when properly situated within the frame this bent central portion is the highest point of the shaft. Between this bent portion and the frame, upon each side, I loosely hang a revolving conical seed or guano reservoir, each provided with covered doors or gates, through which the contents are introduced. The larger ends of these conical reservoirs are arranged adjacent to each other at the center, and the bend in the shaft forces the lower edges or inclined circumferential flanges of the same together at the bottom, where they ride in the drill made by the preceding plow, while all other portions are apart, and allow the operator to view at all times the operation of the feed. These differentially-hung reservoirs have at their inner mouths adjustable plates, between the outer edges of which and the reservoirs the seed, &c., is fed into the drill.

The incline of the peripheries of the cones is so great that the seed, &c., will gravitate to the feed-outlets, notwithstanding the angle at which they are hung upon the shaft.

Referring to the drawings, M represents the horizontal frame; P, the handles; Q, the stay or vertical post, and O the bent shaft. At the forward end is adjustably secured the plow K, and at the rear the covering-plows H.

E represents conical seed-reservoirs, loosely hung on the bent shaft O, as shown, each provided with covered seed or guano inlets $g$, and with inclined flaring flanges G at their largest peripheries.

Adjustably secured in the mouths of the reservoirs are plates F', between the outer edges of which and the inner surfaces of the flanges G are left spaces F, through which the seed, &c., drops into the drill.

I claim as my invention—

1. The conical reservoirs E, having seed-inlets $g$, flanges G, and adjustable feed-plates F', and spaces F, constructed and adapted to serve as and for the purpose set forth.

2. The differentially-hung conical reservoirs E F' G $g$, in combination with the bent shaft O and frame M, as specified.

3. The combination of the conical reservoirs E, having flanges G, seed-inlets $g$, and feed-plates F', with the bent shaft O, frame M, plow K, and coverers H, constructed and arranged as and for the purposes set forth.

SELMAN C. KNIGHT.

Witnesses:
JOHN B. F. LUMPKIN,
J. S. PANCHEN.